US007227337B2

(12) United States Patent
Guang et al.

(10) Patent No.: US 7,227,337 B2
(45) Date of Patent: Jun. 5, 2007

(54) BATTERY CHARGER WITH DUAL USE MICROPROCESSOR

(75) Inventors: Huang Tai Guang, Guangzhou (CN); Xia Ju Jie, Wuxue (CN); Li Wen Hua, Huayang town (CN); Robert Wentink, Chicago, IL (US)

(73) Assignee: International Components Corporation, Westchester, IL (US)

( * ) Notice: Subject to any disclaimer, the term of this patent is extended or adjusted under 35 U.S.C. 154(b) by 0 days.

(21) Appl. No.: 10/897,285

(22) Filed: Jul. 22, 2004

(65) Prior Publication Data

US 2005/0275381 A1 Dec. 15, 2005

Related U.S. Application Data

(63) Continuation-in-part of application No. 10/863,920, filed on Jun. 9, 2004.

(51) Int. Cl.
*H01M 10/46* (2006.01)
(52) U.S. Cl. ...................................... 320/145
(58) Field of Classification Search ................ 320/107, 320/103, 116, 145; 323/282, 297
See application file for complete search history.

(56) References Cited

U.S. PATENT DOCUMENTS

| 4,915,068 | A | * | 4/1990 | Tharman ............... 123/149 R |
| 5,218,286 | A | * | 6/1993 | VanDunk .................. 320/125 |
| 5,321,349 | A | * | 6/1994 | Chang .................... 323/297 |
| 5,504,415 | A | * | 4/1996 | Podrazhansky et al. ..... 320/118 |
| 5,592,071 | A | * | 1/1997 | Brown .................... 323/282 |
| 5,764,030 | A | * | 6/1998 | Gaza .................... 320/116 |
| 5,838,141 | A | | 11/1998 | Sengupta et al. .......... 320/145 |
| 5,847,546 | A | | 12/1998 | Sengupta et al. .......... 320/144 |
| 5,883,487 | A | | 3/1999 | Rosenzweig et al. ....... 318/781 |
| 5,998,966 | A | * | 12/1999 | Gaza .................... 320/116 |
| 6,459,237 | B1 | | 10/2002 | Bausch .................. 320/125 |
| 6,803,746 | B2 | | 6/2003 | Aker et al. .............. 320/139 |
| 6,661,129 | B2 | | 8/2003 | Tamura et al. ............ 310/12 |
| 6,741,066 | B1 | * | 5/2004 | Densham et al. .......... 320/145 |
| 6,888,337 | B2 | * | 5/2005 | Sawyers ................. 320/103 |

OTHER PUBLICATIONS

National Semiconductor, 3 Terminal Adjustable Regulator, May 1997, pp. 1-20, http://www.hep.upenn.edu/SNO/daq/parts/lm317.pdf.*

* cited by examiner

*Primary Examiner*—Edward H. Tso
(74) *Attorney, Agent, or Firm*—Katten Muchin Rosenman LLP; John S. Paniaguas (57) ABSTRACT

A battery charger with a discrete switched regulator provides relatively high efficiency and relatively low cost. Unlike known battery chargers which incorporate switched regulator ICs, the battery charger in accordance with the present invention utilizes the microprocessor for a dual function. In particular, the microprocessor not only controls the charging characteristics of the battery charging circuit but also directly controls the power output of the battery charger by direct control of the discrete switched regulator circuit. By using a discrete switched regulator circuit and redefining the role of the microprocessor, the battery charger in accordance with the present invention is relatively less expensive than known battery chargers which incorporate switched regulator ICs.

11 Claims, 11 Drawing Sheets

BATTERY CHARGER WITH DUAL USE MICROPROCESSOR

CROSS REFERENCE TO RELATED APPLICATIONS

This application is a continuation-in-part of commonly owned copending U.S. patent application Ser. No. 10/863,920, filed on Jun. 9, 2004, entitled "Multiple Cell Battery Charger Configured with a Parallel Topology".

BACKGROUND OF THE INVENTION

1. Field of the Invention

The present invention relates to a battery charger and more particularly, to a relatively low cost battery charger which includes a switched regulator, for example, a synchronous buck regulator, formed from discrete components, which eliminates the need for regulator integrated circuit thus reducing the overall cost of the battery charger.

2. Description of the Prior Art

Known battery chargers are normally configured to receive an unregulated source of 120 volt AC input power. Such battery chargers also include a microprocessor for control and a full wave rectifier for converting the input 120 volt AC power to an unregulated source of DC power. Other known battery chargers are known to receive an unregulated source of DC power, for example, 12 volts DC from a vehicular power system.

Battery chargers are known to include a regulator which receives the unregulated source of DC power and convert it to a regulated source of DC voltage. Both linear and switching type regulators are known. Linear regulators utilize linear devices, such as resistors to provide a relatively constant DC output. Such linear regulators may be formed as an integrated circuit (IC). In a typical application, the linear regulator IC provides a generally linear DC output to the battery charger circuit which normally includes a microprocessor for controlling the charging characteristics of the battery charger and either an on-board or external switching circuit, such as a pulse width modulator (PWM) circuit, to selectively connect and disconnect the battery charger and the battery cell under charge. In such an application, the power control is provided by the regulator IC, which, in turn is controlled by the microprocessor. In other words, in such an application, the microprocessor does not directly control the power output level other than switching the circuit on and off.

Commonly owned U.S. Pat. Nos. 5,764,030 and 5,998,966 disclose the use of a discrete PWM circuit under the control of a microprocessor to selectively connect and disconnect the battery charger and the battery cell under charge. These battery charger circuits utilize a separate linear regulator for controlling the output power level of the charger. Such linear regulators are known to have significant power losses due to the resistive components and are thus not suitable in all applications. For example, such linear regulators are not generally suitable for high efficiency applications. As such, switching type regulators are known to be used in battery chargers for such high efficiency applications.

Both buck and boost switching type regulators are known. Boost regulators are used to boost or raise the voltage of the input source of DC voltage. Buck regulators are used to lower the voltage of the input source of DC voltage. Both boost and buck regulators are known to include a primary and a secondary switch, a choke, a transformer and a diode. The primary switch is normally driven by a pulse width modulator (PWM) circuit.

In order to reduce switching losses, synchronous switching type regulators have been developed. An exemplary synchronous regulator is disclosed in U.S. Pat. No. 5,592,071. In such synchronous regulators, the primary and secondary switches are synchronized in order to reduce losses. Indeed, in such synchronous regulators, the primary switch is turned on while the secondary switch is turned off during the first half of each cycle. Similarly, the primary switch is turned off and the secondary switch is turned on during the second half of each cycle.

Various synchronous regulators are known and available as integrated circuits (ICs). For example, Fairchild Semiconductor model Nos. FAN5234 and RC 5057 and Linear Technology model Nos. LTC 1736 and 1709-85 are known. In battery chargers which utilize such synchronous regulators, the ICs normally control the output power level of the battery charger, which, in turn, are under the control of the microprocessor. Such regulator ICs have become the de facto standard in battery chargers. Unfortunately, regulators ICs, such as synchronous regulator ICs, are relatively expensive and add significant cost to the overall cost of a battery charger. Thus, there is a need for a relatively lower cost battery charger which incorporates a switched regulator for increased efficiency.

SUMMARY OF THE INVENTION

Briefly, the present invention relates to a battery charger which includes a microprocessor, a battery charging circuit and a discrete switched regulator circuit. In accordance with an important aspect of the present invention, the discrete regulator circuit is considerably less expensive than known switched regulator ICs, thus reducing the cost of the battery charger. Unlike known battery chargers which incorporate switched regulator ICs, the battery charger in accordance with the present invention utilizes the microprocessor for a dual function. In particular, the microprocessor not only controls the charging characteristics of the battery charging circuit but also directly controls the power output of the battery charger by direct control of the discrete switched regulator circuit. By using a discrete switched regulator circuit and redefining the role of the microprocessor, the battery charger in accordance with the present invention is relatively less expensive than known battery chargers which incorporate switched regulator ICs.

DESCRIPTION OF THE DRAWING

These and other advantages of the present invention will be readily understood with reference to the following specification and attached drawing wherein.

DETAILED DESCRIPTION

The present invention relates to a battery charger which includes a microprocessor, a battery charging circuit and a discrete switched regulator circuit. Unlike known battery chargers which incorporate switched regulator ICs, the battery charger in accordance with the present invention utilizes the microprocessor for a dual function. In particular, the microprocessor not only controls the charging characteristics of the battery charger as described below and illustrated in FIGS. 3A-3E, but also directly controls the power output of the battery charger by direct control of the discrete switched regulator circuit 24 (FIG. 4). By using a discrete switched regulator circuit and redefining the role of the microprocessor, the battery charger in accordance with the present invention is relatively less expensive than known battery chargers with switched regulators.

Figure 1:
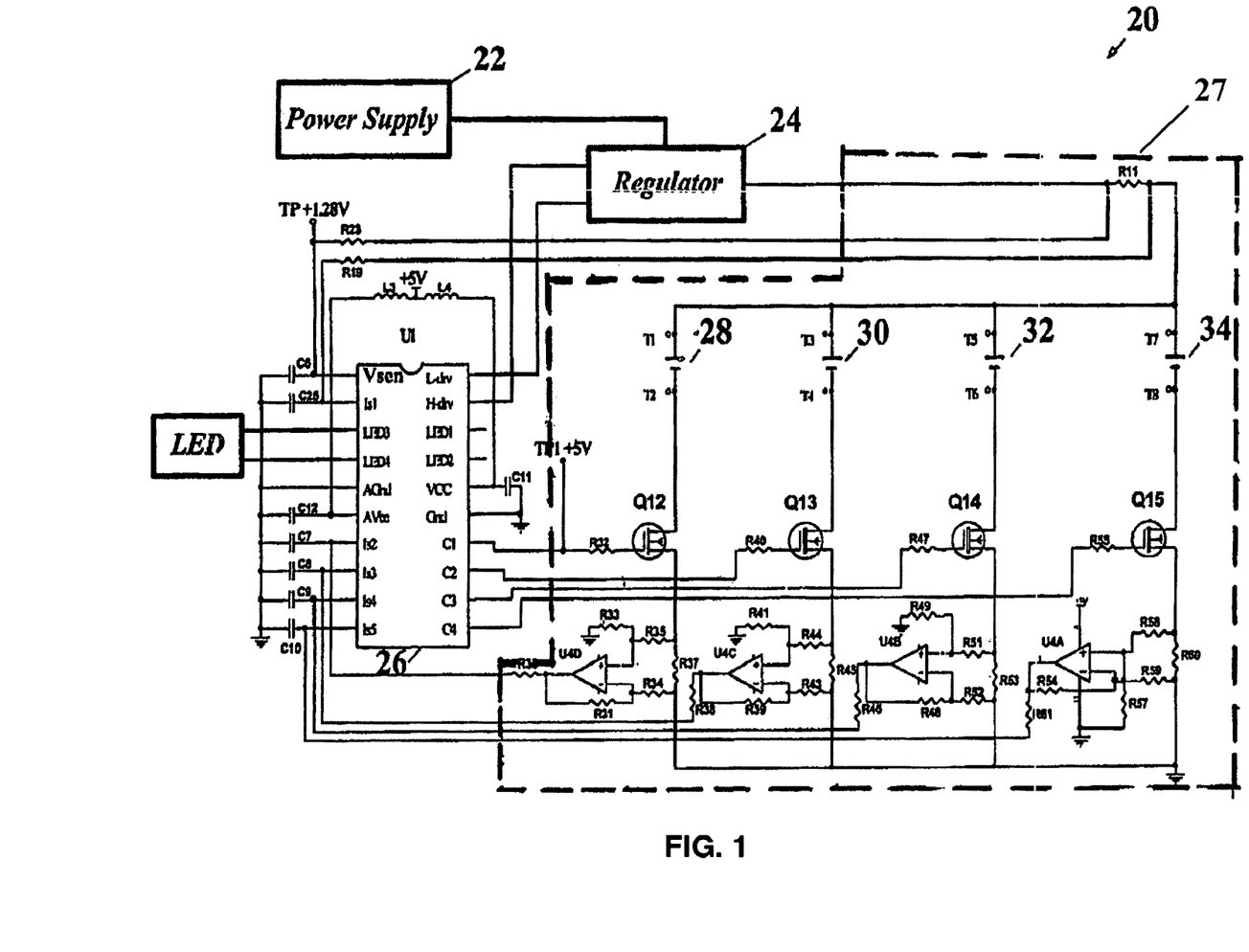
FIG. 1 is a schematic diagram of the battery charger in accordance with the present invention.

An exemplary battery charger is illustrated in FIG. 1 and generally identified with the reference numeral 20. The battery charger 20 includes a power supply 22, a regulator 24, a microprocessor 26 and an exemplary battery charging circuit, shown within the dashed box 27. Although the battery charging circuit 27 is shown and described with a parallel topology, the principles of the present invention are broad enough to cover battery chargers with battery charging circuits with other topologies, such as serial topologies, for example as shown in U.S. Pat. No. 6,580,249, hereby incorporated by reference.

Figure 4:
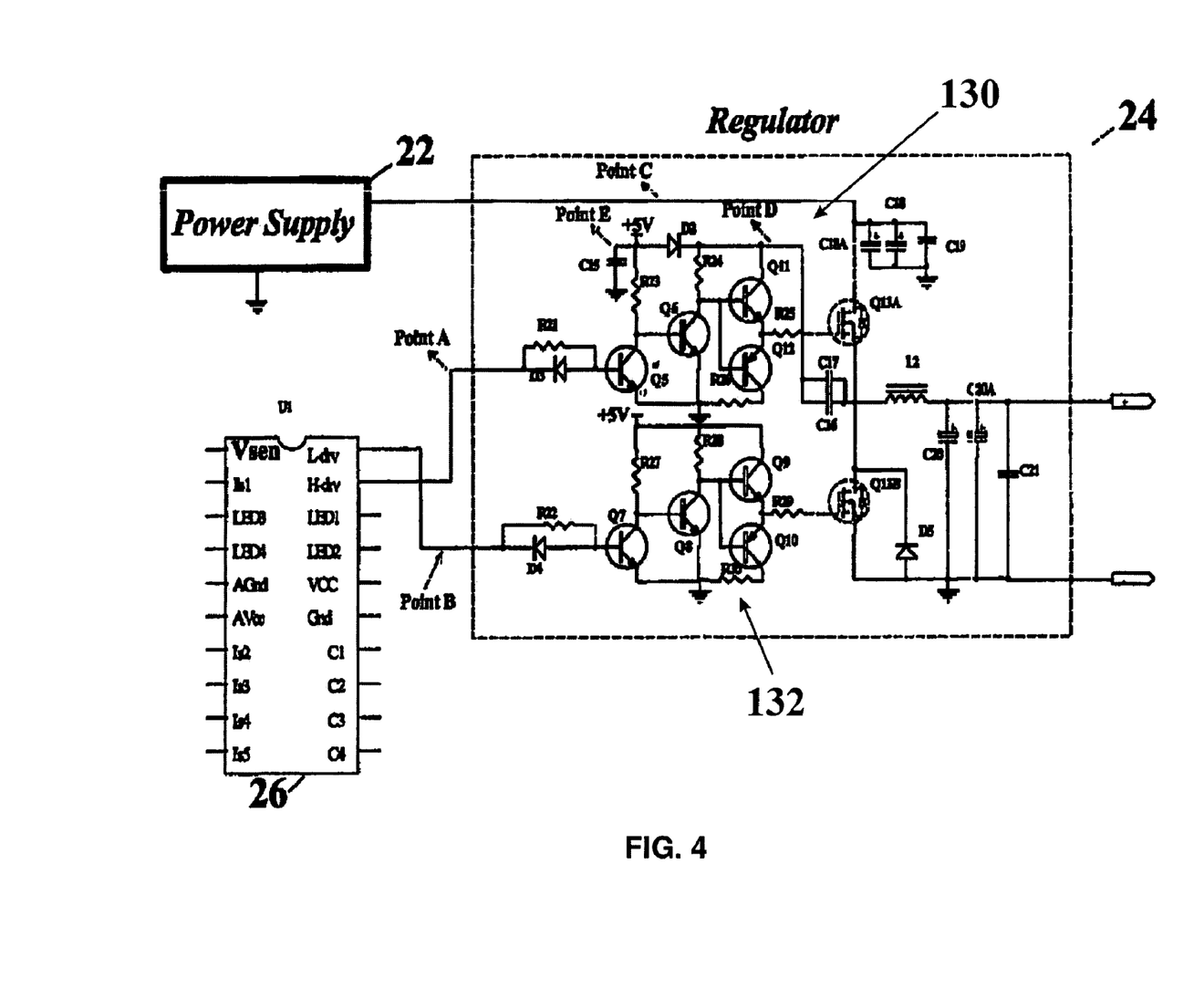
FIG. 4 is a schematic diagram of an exemplary regulator that is part of a battery charger shown connected to a power supply and a microprocessor but shown with the charging circuit removed for clarity.
Figure 5:
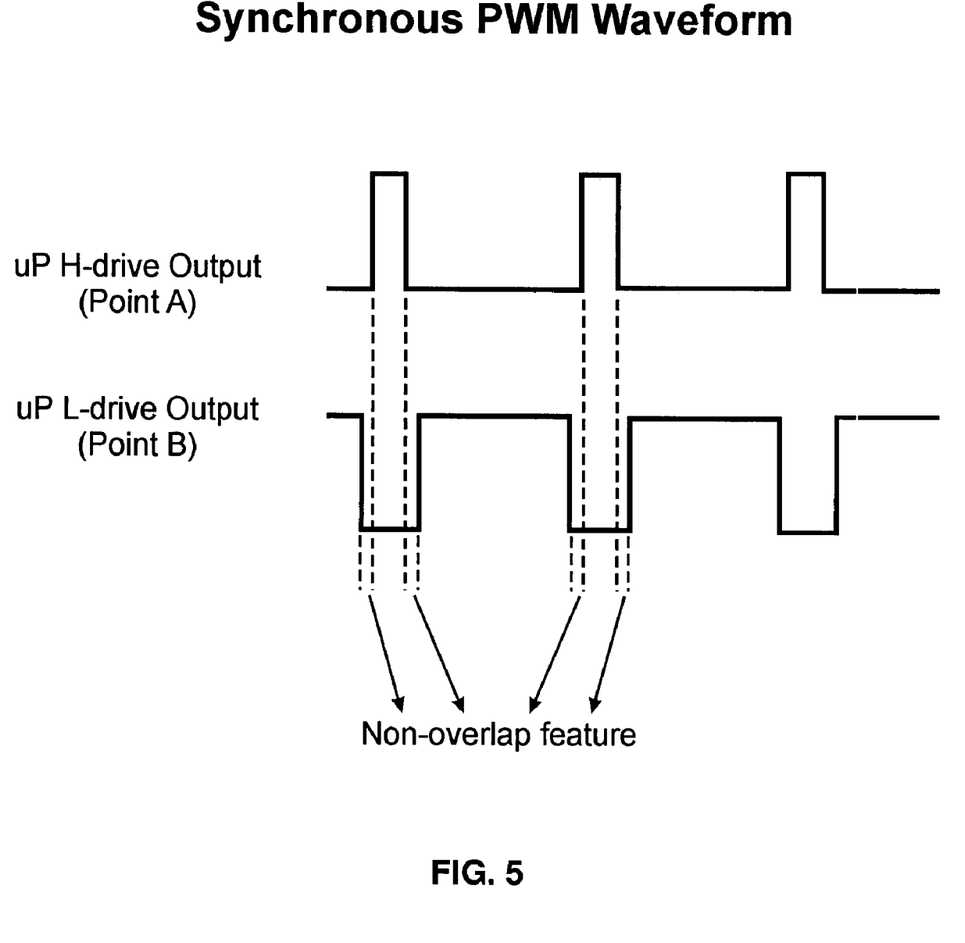
FIG. 5 illustrate exemplary H-drive and L-drive waveforms generated by the microprocessor used to control the regulator illustrated in FIG. 3 illustrating a non-overlapping feature in accordance with one aspect of the present invention.
Figure 6:
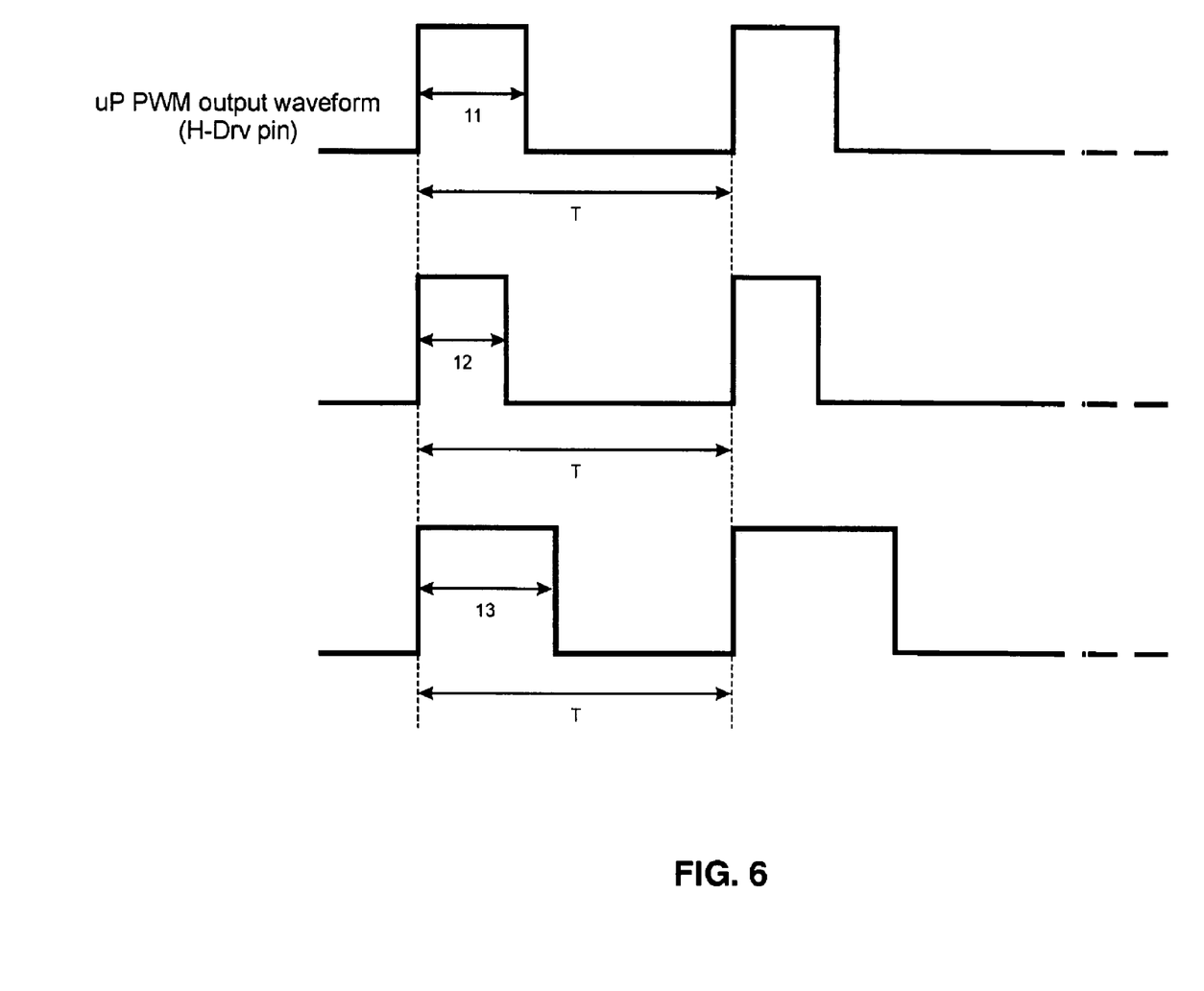
FIG. 6 are exemplary H-drive waveforms at different pulse widths in accordance with the present invention.
Figure 7:
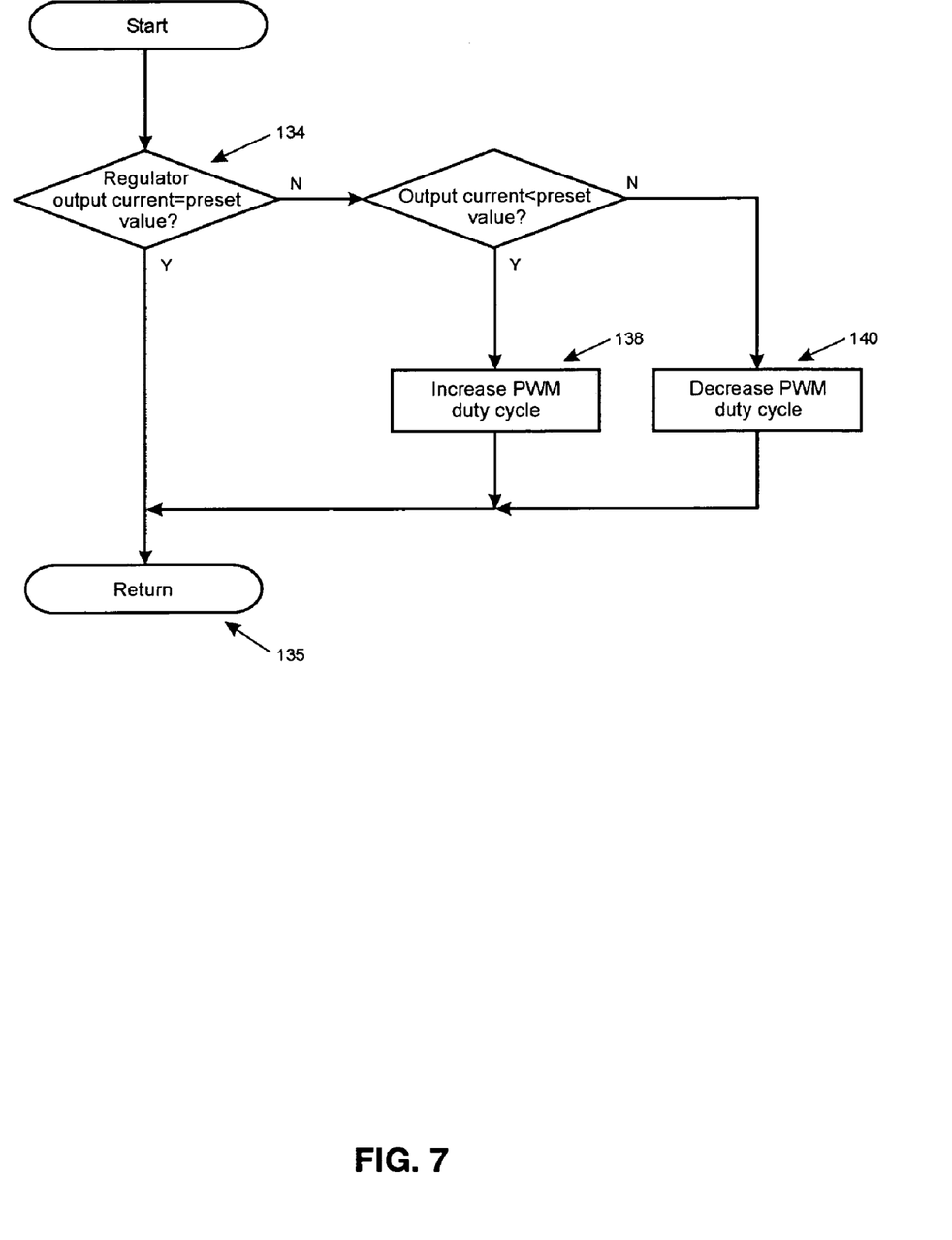
FIG. 7 is an exemplary flow chart for controlling the regulator illustrated in FIG. 4.

The operation of the battery charger 20 with an exemplary battery charging circuit 27 is described below and illustrated in FIGS. 1, 2 and 3A-3E. FIG. 4 illustrates an exemplary synchronous regulator 24 for use with the battery charger 20. For clarity, FIG. 4 shows the battery charger 20 with an exemplary synchronous regulator 24 with the battery charging circuit 27 removed. FIGS. 5 and 6 illustrate exemplary waveforms generated by the microprocessor 26 for controlling the discrete synchronous regulator 24. Finally, FIG. 7 is a flow chart for controlling the regulator 24.

Even though the invention is described and illustrated with a synchronous regulator, the principles of the present invention are equally applicable to virtually any discrete switching regulator. Moreover, the principles of the present invention are equally applicable to multiple cell and single cell battery chargers.

Exemplary Battery Charger

The battery charger, generally identified with the reference 20, includes a power supply 22 and a regulator 24. In an AC application, the power supply 22 is configured to receive a source of AC power, such as 120 volts AC, and convert it to a non-regulated source of DC power by way of a bridge rectifier (not shown), for example, or other device, such as a switched mode power supply. In DC applications, the power supply 22 may simply be a unregulated source of DC, for example in the range of 10 to 16 volts DC, such as a vehicular power adapter from an automobile. The unregulated source of DC power from the power supply 22 is applied to, for example, to a discrete synchronous buck regulator, for example as illustrated in FIG. 4, which generates a regulated source of DC power, which, in turn, is applied to the battery cells to be charged.

The output of the regulator 24 may optionally be controlled by way of a feedback loop. In particular, a total charging current sensing device, such as a sensing resistor R11, may be serially coupled to the output of the regulator 24. The sensing resistor R11 may be used to measure the total charging current supplied by the regulator 24. The value of the total charging current may be dropped across the sensing resistor R11 and sensed by a microprocessor 26. The microprocessor 26 may be programmed to control the regulator 24, as will be discussed in more detail below, to control the regulator 24 based on the state of charge of the battery cells being charged.

As shown in FIG. 1, the battery charger 20 may optionally be configured to charge four battery cells 28, 30, 32, and 34. As shown, these battery cells 28, 30, 32 and 34 are electrically coupled to corresponding pairs of battery terminals: $T_1$ and $T_2$; $T_3$ and $T_4$; $T_5$ and $T_6$; and $T_7$ and $T_8$, respectively. However, the principles of the present invention are applicable to two or more battery cells.

Each battery cell 28, 30, 32 and 34 is serially connected to a switching device, such as a field effect transistor (FET) Q12, Q13, Q14 and Q15. More particularly, the source and drain terminals of each of the FETs Q12, Q13, Q14 and Q15 are serially connected to the battery cells 28, 30, 32 and 34. In order to sense the charging current supplied to each of the battery cells 28, 30, 32 and 34, a current sensing devices, such as the sensing resistors R37, R45, R53, R60, may be serially coupled to the serial combination of the FETs Q12, Q13, Q14 and Q15; and the pairs of battery terminals, $T_1$ and $T_2$; $T_3$ and $T_4$; $T_5$ and $T_6$; and $T_7$ and $T_8$, The serial combination of the battery terminals $T_1$ and $T_2$; $T_3$ and $T_4$; $T_5$ and $T_6$; and $T_7$ and $T_8$; FETs Q12, Q12, Q14 and Q15; and the optional charging current sensing devices R37, R45, R53 and R60, respectively, form a charging circuit for each battery cell 28, 30, 32 and 34. These charging circuits, in turn, are connected together in parallel.

The charging current supplied to each of the battery cells 28, 30, 32 and 34 can vary due to the differences in charge, as well as the internal resistance of the circuit and the various battery cells 28, 30, 32 and 34. This charging current as well as the cell voltage and optionally the cell temperature may be sensed by the microprocessor 26. In accordance with an important aspect of the present invention, the multiple cell battery charger 20 may be configured to optionally sense the charging current and cell voltage of each of the battery cells 28, 30, 32 and 34, separately. This may be done by control of the serially connected FETS Q12, Q13, Q14 and Q15. For example, in order to measure the cell voltage of an individual cell, such as the cell 28, the FET Q12 is turned on while the FETs Q13, Q14 and Q15 are turned off. When the FET 12 is turned on, the anode of the cell 28 is connected to system ground. The cathode of the cell is connected to the $V_{sen}$ terminal of the microprocessor 26. The cell voltage is thus sensed at the terminal $V_{sen}$.

As discussed above, the regulator 24 may be controlled by the microprocessor 26. In particular, the magnitude of the total charging current supplied to the battery cells 28, 30, 32 and 34 may be used to determine the pulse width of the switched regulator circuit 24. More particularly, as mentioned above, the sensing resistor R11 may be used to sense the total charging current from the regulator 24. In particular, the charging current is dropped across the sensing resistor R11 to generate a voltage that is read by the microprocessor 26. This charging current may be used to control the regulator 24 and specifically the pulse width of the output pulse of the pulse width modulated signal forming a closed feedback loop. In another embodiment of the invention, the amount of charging current applied to the individual cells Q12, Q13, Q14 and Q15 may be sensed by way of the respective sensing resistors R37, R45, R53 and R60 and used for control of the regulator 24 either by itself or in combination with the total output current from the regulator 24. In other embodiments of the invention, the charging current to one or more of the battery cells 28, 30, 32 and 34 may be used for control.

In operation, during a charging mode, the pulse width of the regulator 24 is set to an initial value. Due to the differences in internal resistance and state of charge of each of the battery cells 28, 30, 32 and 34 at any given time, any individual cells which reach their fully charged state, as indicated by its respective cell voltage, as measured by the microprocessor 26. More particularly, when the microprocessor 26 senses that any of the battery cells 28, 30, 32 or 34 are fully charged, the microprocessor 26 drives the respective FETs Q12, Q13, Q14, or Q15 open in order to disconnect the respective battery cell 28, 30, 32 and 34 from the circuit. Since the battery cells are actually disconnected from the circuit, no additional active devices are required to protect the cells 28, 30, 32 and 34 from discharge. Thus, a single active device per cell (i.e., FETs Q12, Q13, Q14 and Q15) are used in place of two active devices normally used in multiple cell battery chargers configured with a serial topology to provide the dual function of preventing overcharge to individual cells and at the same time protecting those cells from discharge.

As mentioned above, the charging current of each of the battery cells 28, 30, 32 and 34 is dropped across a sensing resistor R37, R45, R53 and R60. This voltage may be scaled by way of a voltage divider circuit, which may include a plurality of resistors R30, R31, R33 and R34, R35, R38, R39, R41, R43, R44, R46, R48, R49, R51, R52, R54, R57, R58, R59, R61, as well as a plurality of operational amplifiers U4A, U4B, U4C and U4D. For brevity, only the amplifier circuit for the battery cell 28 is described. The other amplifier circuits operate in a similar manner. In particular, for the battery cell 28, the charging current through the battery cell 28 is dropped across the resistor R37. That voltage drop is applied across a non-inverting input and inverting input of the operational amplifier U4D.

The resistors R31, R33, R34, and R35 and the operational amplifier U4D form a current amplifier. In order to eliminate the off-set voltage, the value of the resistors R33 and R31 value are selected to be the same and the values of the resistors R34 and R35 value are also selected to be the same. The output voltage of the operational amplifier U4D=voltage drop across the resistor R37 multiplied by the quotient of the resistor value R31 resistance value divided by the resistor value R34. The amplified signal at the output of the operational amplifier U4D is applied to the microprocessor 26 by way of the resistor R30. The amplifier circuits for the other battery cells 30, 32, and 34 operate in a similar manner.

Exemplary Charge Termination Techniques

The battery charger in accordance with the present invention can implement various charge termination techniques, such as temperature, pressure, negative delta, and peak cut-out techniques. These techniques can be implemented relatively easily by program control and are best understood with reference to FIG. 2. For example, as shown, three different characteristics as a function of time are shown for an exemplary nickel metal hydride (NiMH) battery cell during charging. In particular, the curve 40 illustrates the cell voltage as a function of time. The curves 42 and 44 illustrate the pressure and temperature characteristics, respectively, of a NiMH battery cell under charge as a function of time.

In addition to the charge termination techniques mentioned above, various other charge termination techniques the principles of the invention are applicable to other charge termination techniques as well. For example, a peak cut-out charge termination technique, for example, as described and illustrated in U.S. Pat. No. 5,519,302, hereby incorporated by reference, can also be implemented. Other charge termination techniques are also suitable.

Figure 2:
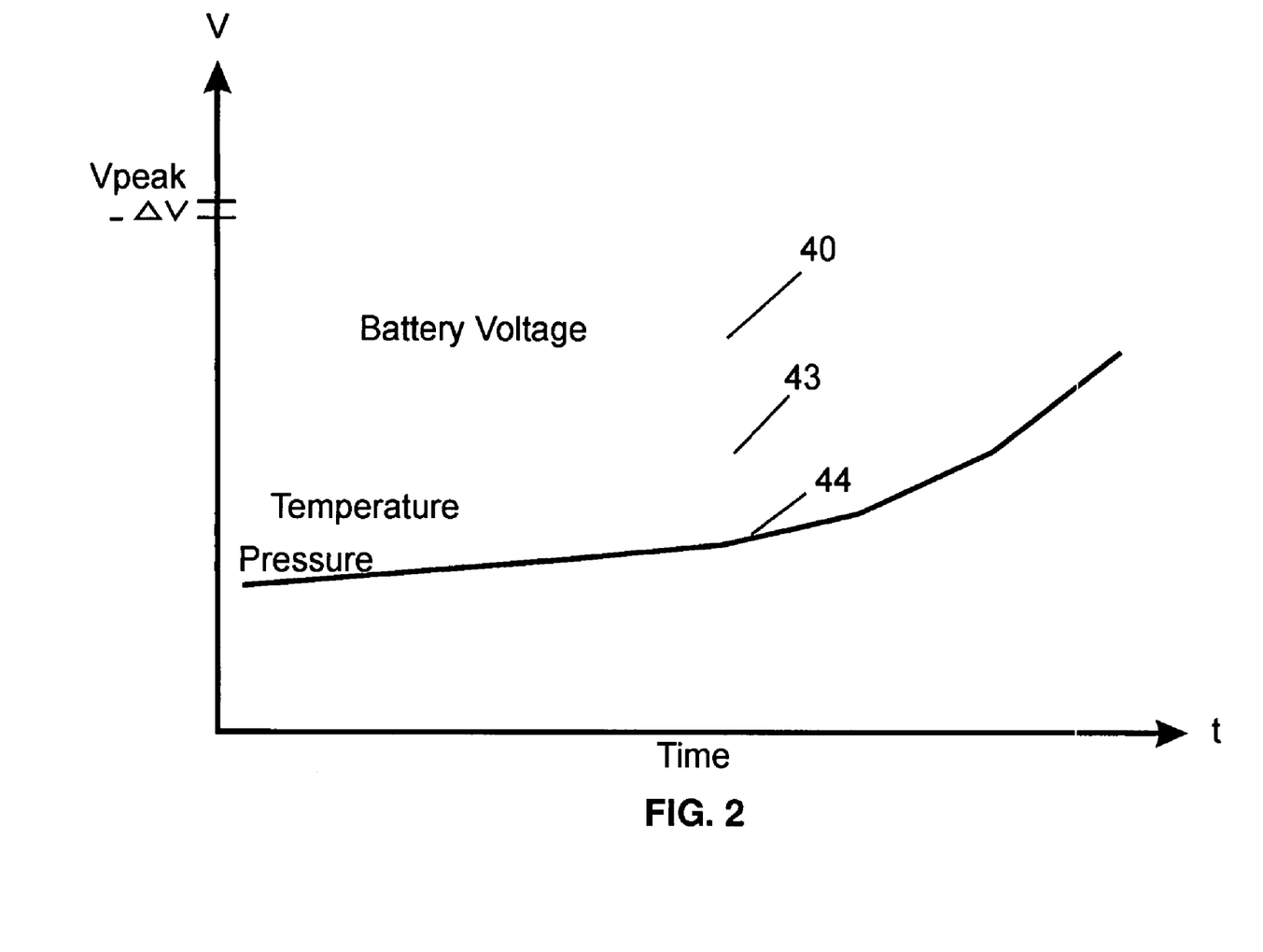
FIG. 2 is a graphical illustration of the voltage, pressure, and/or temperature charging characteristics as a function of time as an exemplary NiMH battery.

FIG. 2 illustrates an exemplary characteristic curve 40 for an exemplary NiMH or NiCd battery showing the relationship among current, voltage and temperature during charge. More particularly, the curve 40 illustrates the cell voltage of an exemplary battery cell under charge. In response to a constant voltage charge, the battery cell voltage, as indicated by the curve 40, steadily increases over time until a peak voltage value $V_{peak}$ is reached as shown. As illustrated by the curve 44, the temperature of the battery cell under charge also increases as a function of time. After the battery cell reaches its peak voltage $V_{peak}$, continued charging at the increased temperature causes the battery cell voltage to drop. This drop in cell voltage can be detected and used as an indication that the battery's cell is fully charged. This charge termination technique is known as the negative delta V technique.

As discussed above, other known charge termination techniques are based on pressure and temperature. These charge termination techniques rely upon physical characteristics of the battery cell during charging. These charge termination techniques are best understood with respect to FIG. 2. In particular, the characteristic curve 42 illustrates the internal pressure of a NiMH battery cell during charging while the curve 44 indicates the temperature of a NiMH battery cell during testing. The pressure-based charge termination technique is adapted to be used with battery cells with internal pressure switches, such as the Rayovac in-cell charge control $(I-C^3)^1$, NiMH battery cells, which have an internal pressure switch coupled to one or the other anode or cathode of the battery cell. With such a battery cell, as the pressure of the cell builds up due to continued charging, the internal pressure switch opens, thus disconnecting the battery cell from the charger.

Temperature can also be used as a charge termination technique. As illustrated by the characteristic curve 44, the temperature increases rather gradually. After a predetermined time period, the slope of the temperature curve becomes relatively steep. This slope, dT/dt may be used as a method for terminating battery charge.

The battery charge in accordance with the present invention can also utilize other known charge termination techniques. For example, in U.S. Pat. No. 5,519,302 discloses a peak cut-out charge termination technique in which the battery voltage and temperature is sensed. With this technique, a load is attached to the battery during charging. The battery charging is terminated when the peak voltage is reached and reactivated as a function of the temperature.

Exemplary Battery Charger Software Control

Figure 3A:
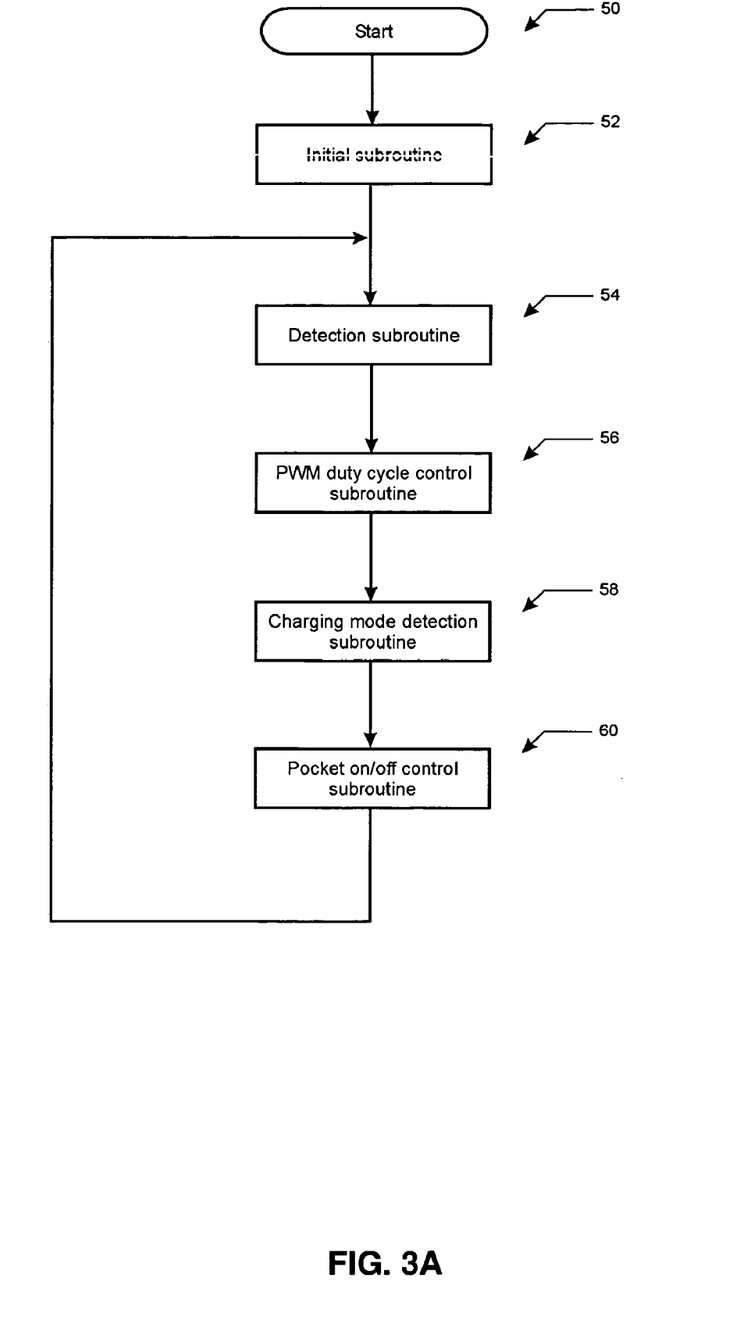
FIGS. 3A-3E illustrate exemplary flow-charts for the battery charger for the present invention.

FIGS. 3A-3E illustrate exemplary flow-charts for controlling the battery charger in accordance with the present invention. Referring to the main program, as illustrated in FIG. 3A, the main program is started upon power-up of the microprocessor 26 in step 50. Upon power-up, the microprocessor 26 initializes various registers and closes all of the FETs Q12, Q13, Q14, and Q15 in step 52. The microprocessor 26 also sets the pulse-width of the PWM output of the regulated 24 to a nominal value. After the system is initialized in step 52, the voltages across the current sensing resistors R37, R45, R53, and R60 are sensed to determine if any battery cells are currently in any of the pockets in step 54. If the battery cell is detected in one of the pockets, the system control proceeds to step 56 in which the duty cycle of the PWM out-put of the regulator 24 is set. In step 58, a charging mode is determined. After the charging mode is determined, the microprocessor 26 takes control of the various pockets in step 60 and loops back to step 54.

Figure 3B:
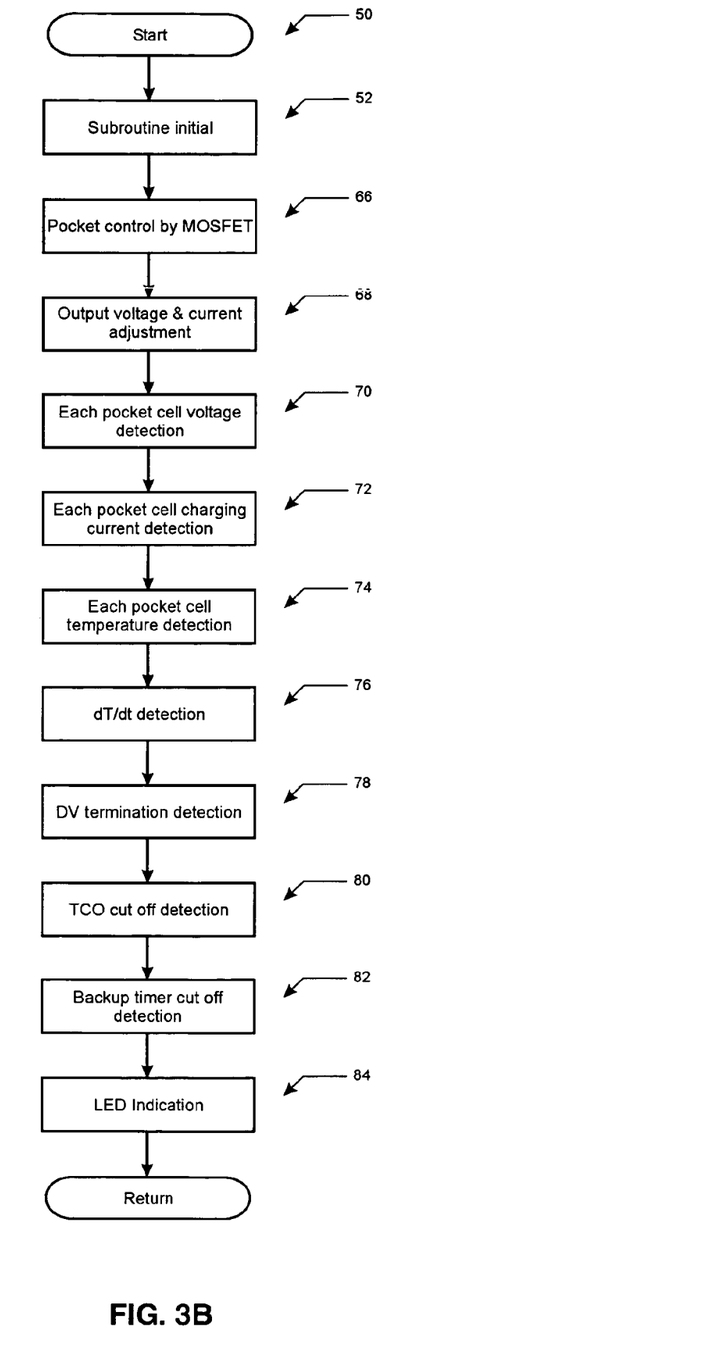

A more detailed flow-chart is illustrated in FIG. 3B. Initially, in step 50, the system is started upon power-up of the microprocessor 26. On start-up, the system is initialized in step 52, as discussed above. As mentioned above, the battery charger in accordance with the present invention includes two or more parallel connected charging circuits. Each of the charging circuits includes a switching device, such as a MOSFETs Q12, Q13, Q14, or Q15, serially coupled to the battery terminals. As such, each charging circuit may be controlled by turning the MOSFETs on or off, as indicated in step 66 and discussed in more detail below. In step 68, the output voltage and current of the regulator 24 is adjusted to a nominal value by the microprocessor 26. After the regulator output is adjusted, a state of the battery cell is checked in step 70. As mentioned above, various charge termination techniques can be used with the present invention. Subsequent to step 70, the charging current is detected in step 72 by measuring the charging current dropped across the current sensing resistors R37, R45, R53, or R60.

One or more temperature based charge termination techniques may be implemented. If so, a thermistor may be provided to measure the external temperature of the battery cell. One such technique is based on dT/dt. Another technique relates to temperature cutoff. If one or more of the temperature based techniques are implemented, the temperature is measured in step 74. If a dT/dt charge termination technique is utilized, the temperature is taken along various points along the curve 44 (FIG. 2) to determine the slope of the curve. When the slope is greater than a predetermined threshold, the FET for that cell is turned off in step 76.

As mentioned above, the system may optionally be provided with negative delta V charge termination. Thus, in step 78, the system may constantly monitor the cell voltage by turning off all but one of the switching devices Q12, Q13, Q14, and Q15 and measuring the cell voltage along the curve 40 (FIG. 2). When the system detects a drop in cell voltage relative to the peak voltage $V_{sen}$, the system loops back to step 66 to turn off the switching device Q12, Q13, Q14, and Q15 for that battery cell.

As mentioned above, a temperature cut-out charge termination technique may be implemented. This charge termination technique requires that the temperature of the cells 28, 30, 32 and 34 to be periodically monitored. Should the temperature of any the cells 28, 30, 32 and 34 exceed a predetermined value, the FET for that cell is turned off in step 80. In step 82, the charging time of the cells 28, 30, 32, and 34 is individually monitored. When the charging time exceeds a predetermined value, the FET for that cell is turned off in step 82. A LED indication may be provided in step 84 indicating that the battery is being charged.

Figure 3C:
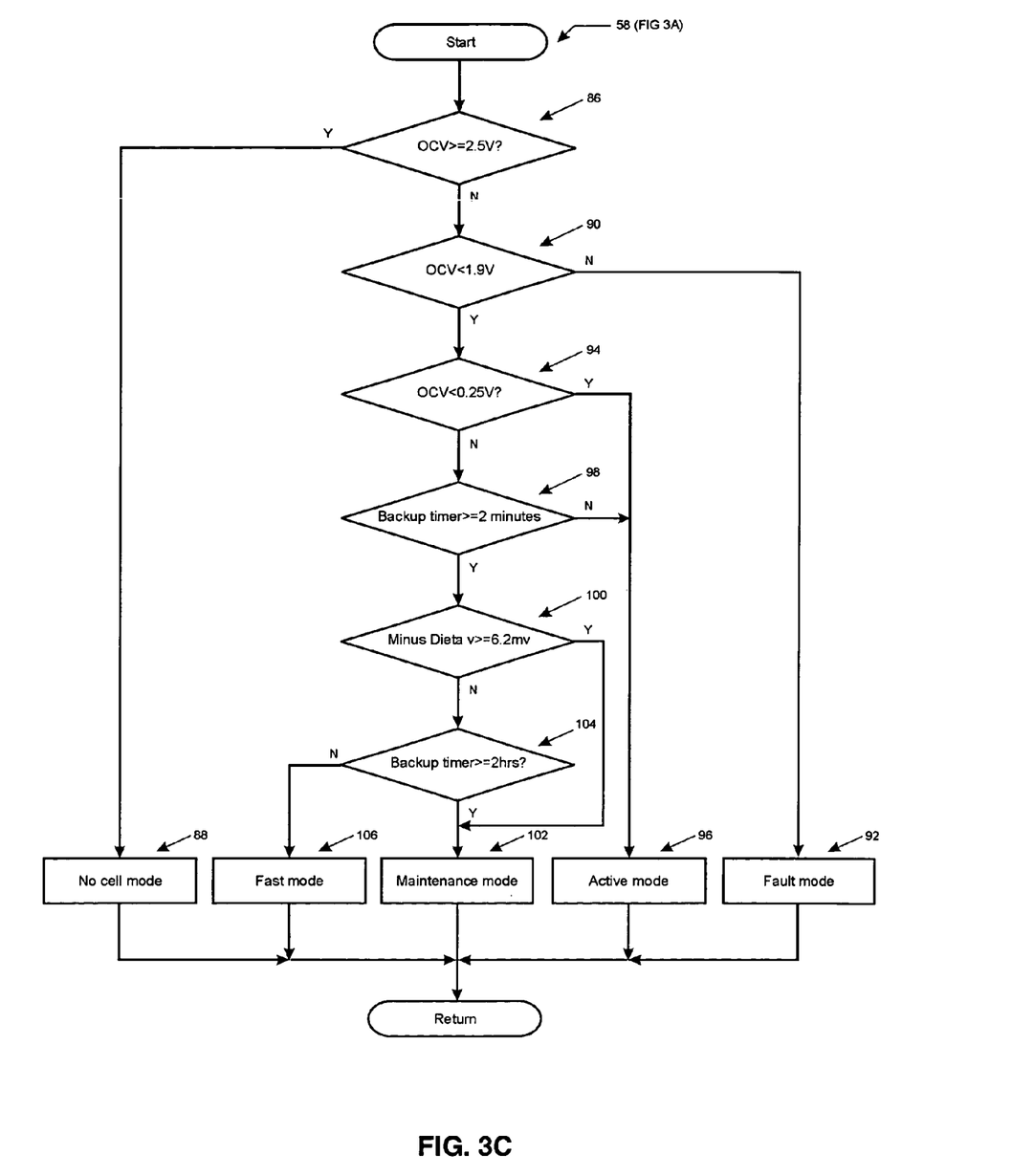

FIG. 3C illustrates a subroutine for charging mode detection. This subroutine may be used to optionally indicate whether the battery charger 20 is in a "no-cell" mode; "main-charge" mode; "maintenance-charge" mode; an "active" mode; or a "fault" mode. This subroutine corresponds to the block 58 in FIG. 3A. The system executes the charging mode detection subroutine for each cell being charged. Initially, the system checks in step 86 the open-circuit voltage of the battery cell by checking the voltage at terminal $V_{sen}$ of the microprocessor 26. If the open-circuit voltage is greater than or equal to a predetermined voltage, for example, 2.50 volts, the system assumes that no battery cell is in the pocket, as indicated in step 88. If the open-circuit voltage is not greater than 2.50 volts, the system proceeds to step 90 and checks whether the open-circuit voltage is less than, for example, 1.90 volts. If the open circuit voltage is not less than 1.90 volts, the system indicates a fault mode in step 92. If the open-circuit voltage is less than 1.90 volts, the system proceeds to step 94 and checks whether the open-circuit voltage is less than, for example, 0.25 volts. If so, the system returns an indication that the battery charger is in inactive mode in step 96. If the open-circuit voltage is not less than, for example, 0.25 volts, the system proceeds to step 98 and checks whether a back-up timer, is greater than or equal to, for example, two minutes. If not, the system returns an indication that battery charger 20 is in the active mode in step 96. If the more than, for example, two minutes has elapsed, the system checks in step 100 whether the battery cell voltage has decreased more than a predetermined value, for example, 6.2 millivolts. If so, the system returns an indication in step 102 of a maintenance mode. If not, the system proceeds to step 104 and determines whether the back-up timer is greater or equal to a maintenance time period, such as two hours. If not, the system returns an indication in step 106 of a main charge mode. If more than two hours, for example has elapsed, the system returns an indication in step 102 of a maintenance mode.

Figure 3D:
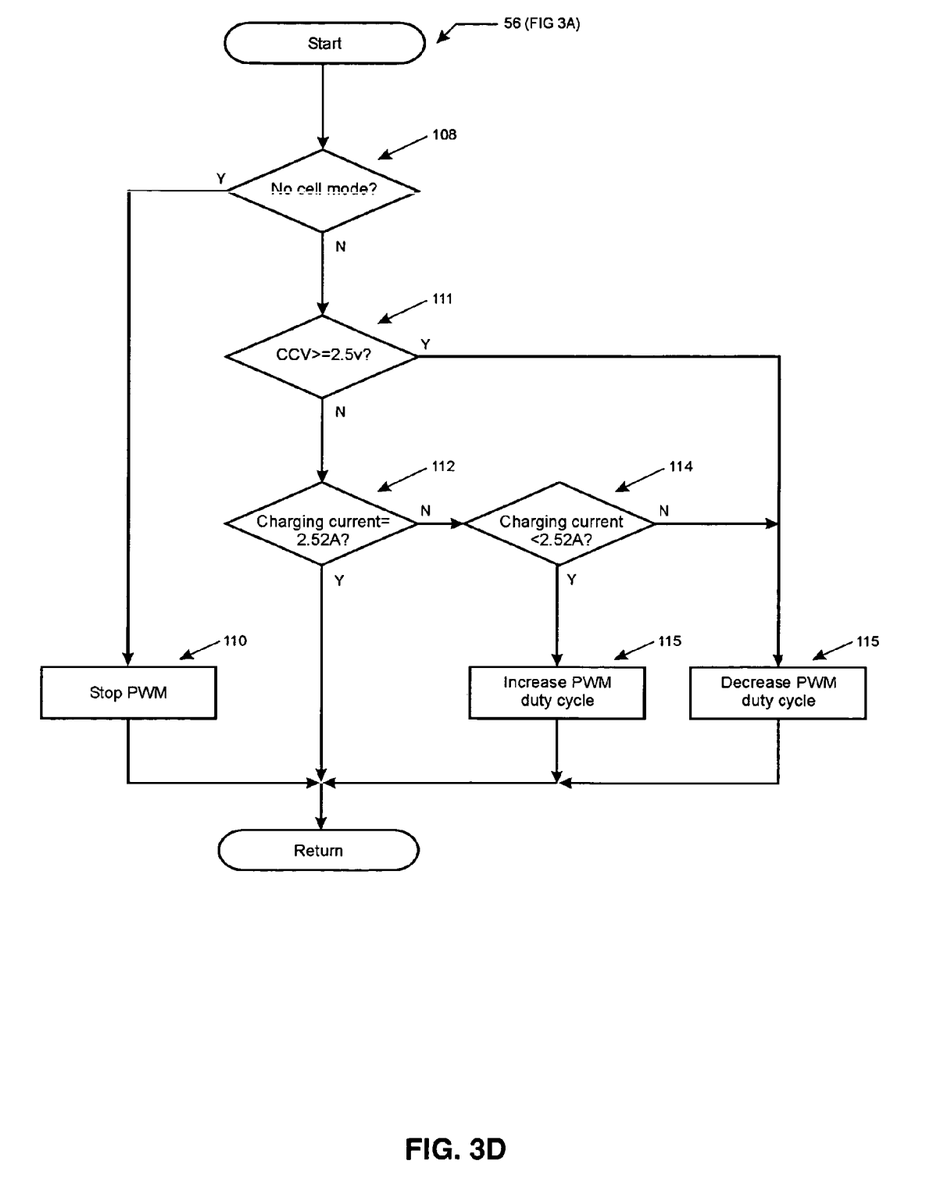

FIG. 3D illustrates a subroutine for the PWM duty cycle control. This subroutine corresponds to block 56 in FIG. 3A. This subroutine initially checks whether or not a cell is present in the pocket in step 108 as indicated above. If there is no cell in the pocket, the duty cycle of the PWM is set to zero in step 110. When there is a battery cell being charged, the PWM output current of the regulator 24 is sensed by the microprocessor 26 by way of sensing resistor R11. The microprocessor 26 uses the output current of the regulator 24 to control the PWM duty cycle of the regulator 24. Since the total output current from the regulator 24 is dropped across the resistor R11, the system checks in step 111 whether the voltage $V_{sen}$ is greater than a predetermined value, for example, 2.50 volts in step 111. If so, the PWM duty cycle is decreased in step 115. If not, the system checks whether the total charging current for four pockets equal a predetermined value. If so, the system returns to the main program. If not, the system checks in step 114 whether the charging current is less than a preset value. If not, the PWM duty cycle is decreased in step 115. If so, the PWM duty cycle is increased in step 116.

Figure 3E:
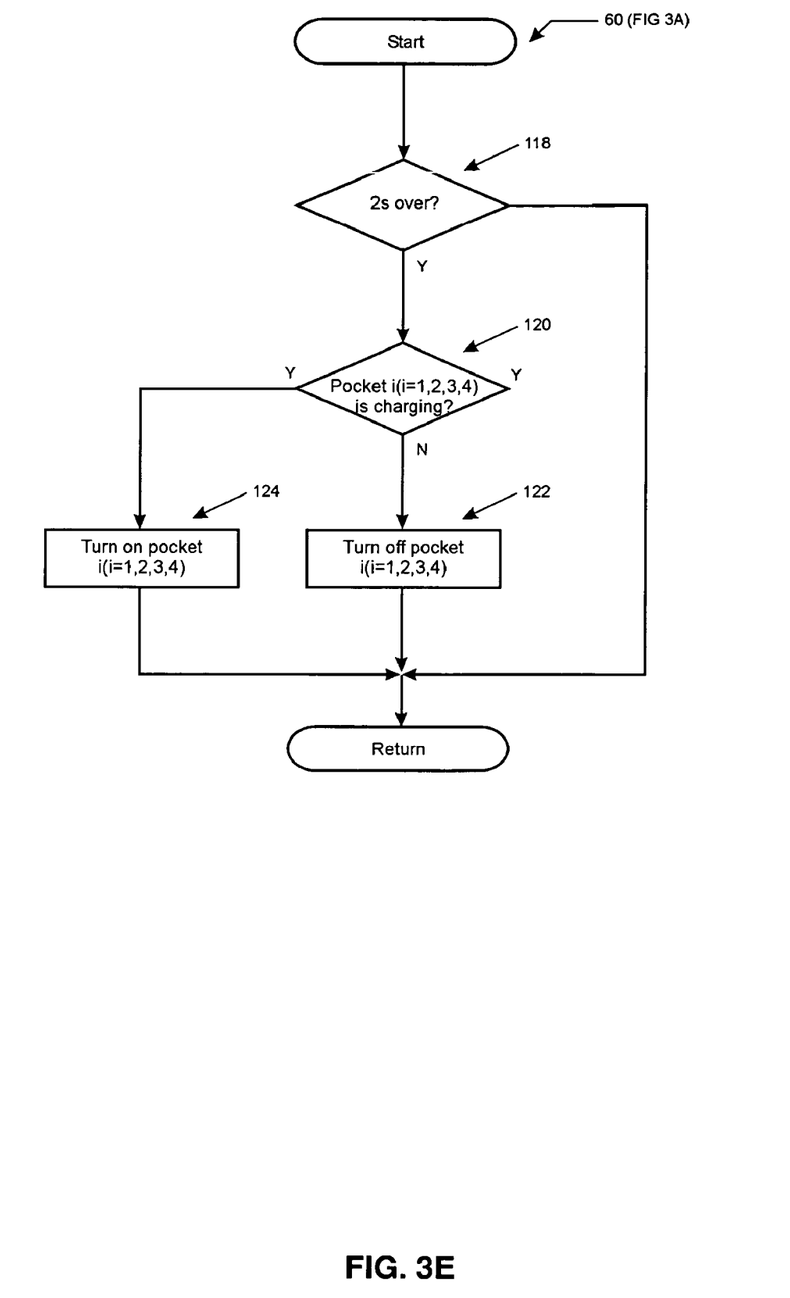

The pocket on-off subroutine is illustrated in FIG. 3E. This subroutine corresponds to the block 60 in FIG. 3A. Initially, the system checks in step 118 whether the battery cell in the first pocket (i.e. channel 1) has been fully charged. If not, the system continues in the main program in FIG. 3A, as discussed above. If so, the system checks in step 120 which channels (i.e pockets) are charging in order to take appropriate action. For example, if channel 1 and channel 2 are charging and channel 3 and channel 4 are not charging, the system moves to step 122 and turns off channel 3 and channel 4, by turning off the switching devices Q14 and Q15. and moves to step 124 and turns on channel 1 and channel 2, by turning on the switching device Q12 and Q13.

The channels refer to the individual charging circuits which include the switching devices Q12, Q13, Q14, and Q15. The channels are controlled by way of the switching devices Q12, Q13, Q14 or Q14 being turned on or off by the microprocessor 26.

Dual Function Microprocessor

As mentioned above, the battery charger 20 in accordance with the present invention eliminates a relatively expensive regulator IC and replaces it, with a discrete switching regulator in order to reduce cost. In doing so, the function of the microprocessor 26 is redefined. In particular, in accordance with the present invention, the microprocessor 26 controls the battery charging circuit 27(FIG. 1) as illustrated in FIGS. 3A–3E and also controls the power output as illustrated in FIGS. 5 and 6 by directly controlling the discrete regulator 20 (FIG. 4).

Turning to FIG. 4, an exemplary discrete regulator 24 is shown. However, as discussed above, the principles of the present invention apply to any switching type regulator. The discrete regulator 24 is shown with a primary switch Q13A and a secondary switch Q13B, configured, for example as FETs. The primary and secondary switches Q13A and Q13B are under the control of a primary driver circuit 130 and a secondary driver circuit 132, respectively. As will be discussed in more detail below, the primary and secondary switches Q13A and Q13B are controlled such that only one of the switches Q13A, Q13B is on at a time.

As shown in FIG. 4, the microprocessor 26 controls the regulator 24 by way of the waveforms generated at its H-drv and L-drv pins. In particular, the H-drv pin is connected to the primary driver circuit 130 while the L-drv pin is connected to the secondary driver circuit 132. In order to prevent the primary and secondary switches Q13A and Q13B from being turned on at the same time which would result in a short circuit across the power supply 22, the microprocessor 26 generates non-overlapping waveforms as shown in FIG. 5. More particularly, the primary switch Q13A is closed when the H-drv output waveform is high and open when the H-drv output waveform is low. Similarly, the secondary switch Q13B is only closed when the L-drv output waveform is high and open when the L-drv output waveform is low. As shown in FIG. 5, the H-drv and L-drv waveforms are configured so that the respective high output pulses do not overlap.

The driving circuit 130 includes a plurality of transistors Q5, Q6, Q11 and Q12, capacitors C15, C16, C17, C18, C18A and C19, resistors R21, R23, R24 and R26 and diodes D2 and D3. Similarly, the driving circuit 132 includes a plurality of transistors Q7, Q8, Q9 and Q10 and resistors R22, R27, R28, R29 and R30.

Since both of the driving circuits operate in a similar manner only the driving circuit 130 is discussed for brevity. With respect to the driving circuit 130, when the microprocessor 26 outputs a high pulse at its H-drv pin, the transistor Q5 is turned on by way of the current limiting resistor R21. This causes the collector of the transistor Q5 to go low. Since the collector of the transistor Q5 is tied to the base of the transistor Q6, the transistor Q6 is turned off when the collector of the transistor Q5 is low. When the transistor Q6 is turned off, the base terminals of the transistors Q11 and Q12 transition from a low to a high level. The transistors Q11 and Q12 are complementary. As such, when the respective base terminals of the transistors Q11 and Q12 are brought to a high level, the transistor Q11 turns on and the transistor Q12 turns off. Turning on the transistor Q11 causes the primary switch FET Q13A to be turned on by way of the current limiting resistor R25.

The driving circuit 130 also includes various other components for various purposes, as discussed below. For example, the capacitors C18, C18A and C19 are used to stabilize the output voltage of the power supply 22 at point C. The capacitor C15 is used to stabilize the voltage at the collector terminal of the transistor Q5, identified on FIG. 4 as point E. The resistors R23, R24 and R26 are load resistors, serially connected to the collector terminals of the transistors Q5, Q6 and Q12, respectively.

In order to keep the primary switch Q13A continuously on after it has been switched on, the gate terminal of the primary switch Q13A must be greater than the source terminal voltage at the gate threshold voltage. The voltage at point D must always be equal to or greater than the sum of the voltages at points C and E. As such, the capacitors C16 and C17 are used to connect the high frequency output of the primary switch Q13A to the cathode of the diode D2 so that diode D2 turns on and off at the same frequency as the primary switch Q13A. This boosts the voltage at point D so that it is always equal to the sum of the voltages at the points E and C which allows a relatively low cost N channel MOSFETs to be used for the primary switch Q13A instead of a relatively higher cost P channel MOSFETs.

In operation, when the microprocessor 26 detects insertion of a battery cell 28, 30, 32 or 34(FIG. 1) in one of the pockets, for example, by sensing the voltage across one of the current sensing resistors R37, R45, R53 or R60, the microprocessor 26 generates the waveforms illustrated in FIG. 5 at its H-drv and L-drv terminals. As discussed above, the high pulse at the H-drv terminal causes the primary switch to close, thus initially connecting the power supply 22 to a choke L2 (FIG. 1) which, in turn, provides output current to the battery cell 28, 30, 32 or 34 and storing energy in the choke L2. Subsequently, the primary switch Q13A is turned off and the secondary switch Q13B is turned on. Turning on the secondary switch Q13B, causes the energy stored in the choke L2 to circulate through the battery cell 28, 30, 32 or 34 to provide continuous output current to the battery cell 28, 30, 32 or 34. A diode D5 is connected in parallel across the secondary switch Q13B. The diode D5 is a free wheeling diode and provides a current path around the secondary switch Q13B when the secondary switch Q13B is opened to prevent a sudden interruption of the current through the choke L2. The process of closing and opening the primary and secondary switches Q13A and Q13B is repeated for subsequent cycles.

As mentioned above, the microprocessor 26 generates the waveforms illustrated in FIG. 5 to control the regulator 24. As also mentioned above, the regulator 24 forms a closed feedback loop with the microprocessor. Based upon on the voltage across the resistor R11 (FIG. 1) and/or the voltages across the sensing resistors R37, R45, R53 and R60, the microprocessor 26 adjusts the pulse width of the waveform generated at its H-drv pin as generally shown in FIG. 6. The waveform generated at the L-drv pin is also adjusted so that there is no overlap in the high pulses in the waveforms as discussed above.

Referring to FIG. 7, the system checks in step 134 whether the output current and the output voltage of the regulator 24 are at a preset value. If so, a waveform is generated at the H-drv pin having a pulse width t, as in FIG.

6 and returns in step 135. If the system detects in step 136 that the output current and the output voltage of the regulator 24 are less than a preset value, the pulse width or duty cycle of the waveform generated at the H-drv pin is increased from $t_1$ to $t_3$ in step 138. Alternatively, if the system detects in step 140 that the regulator output current and the output voltage is greater than a preset value, the pulse width is decreased from $t_1$ to $t_2$ in step 140.

Obviously, many modifications and variations of the present invention are possible in light of the above teachings. Thus, it is to be understood that, within the scope of the appended claims, the invention may be practiced otherwise than as specifically described above.

We claim:

1. A battery charger comprising:
   a regulator for receiving an input voltage and supplying a regulated supply of DC voltage at its output, said regulator configured to selectively connect said input voltage to at least one battery terminal under the control of a pulse width modulated (PWM) drive signal;
   at least one charging circuit for charging a battery cell, said at least one charging circuit electrically coupled to said regulator, said at least one charging circuit comprising;
   at least one pair of battery terminals adapted to be coupled to a battery cell;
   at least one switching device serially coupled to said at least one pair of battery terminals for selectively connecting and disconnecting said pair of terminals from said charging circuit forming a charging circuit; and
   a microprocessor operatively coupled to said at least one pair of battery terminals for monitoring one or more characteristics of said battery cell under charge and selectively controlling the switching device as a function of one or more charge termination functions, said microprocessor also configured to generate a PWM drive signal for controlling said regulator as a function of said one or more characteristics of said battery cell and selectively causing said input voltage to be connected to said at least one battery terminal.

2. The battery charger as recited in claim 1, wherein said regulator includes a pulse width modulated (PWM) output.

3. The battery charger as recited in claim 2, wherein said charging circuit includes a charging current resistor serially coupled to said at least one pair of battery terminals.

4. The battery charger as recited in claim 3, wherein said one or mere characteristics include the charging current sensed by said charging current resistor which forms a closed feedback loop with said regulator in order to control said PWM output as a function of said charging current.

5. The battery charger as recited in claim 1, wherein said charging circuit is configured to enable said microprocessor to sense the voltage across said at least one pair of terminals.

6. The battery charger as recited in claims 1, wherein said regulator includes a primary driver circuit for controlling a primary switch and a secondary driver circuit for controlling a secondary switch, and a choke.

7. The battery charger as recited in claim 6, wherein said microprocessor is configured to generate a first waveform for selectively closing said primary switch to initially supply charging current to the battery cell under charge and charge said choke and subsequently opening said primary switch.

8. The battery charger as recited in claim 7, further including a freewheeling diode and wherein said microprocessor is configured to generate a second waveform for selectively controlling said secondary switch to provide a closed current path through said freewheeling diode, said choke and said secondary switch in order to prevent sudden interruption of said charging current to said choke when said primary switch is opened.

9. The battery charger as recited in claim 8, wherein said microprocessor is configured to generate one or both of said first waveform and said second waveform as pulses with variable pulse widths.

10. The battery charger as recited in claim 9, wherein said microprocessor varies one or both of said pulse widths as a function of the charging current to the battery cell under charge.

11. The battery charger as recital in claim 1, wherein said regulator is formed from a plurality of discrete components.

* * * * *